(12) United States Patent
Xu

(10) Patent No.: US 10,748,304 B2
(45) Date of Patent: Aug. 18, 2020

(54) COLOR SEARCH USING A SMARTPHONE AND A REFERENCE COLOR CHART

(71) Applicant: Datacolor Inc., Lawrenceville, NJ (US)

(72) Inventor: Zhiling Xu, West Windsor, NJ (US)

(73) Assignee: DATACOLOR INC., Lawrenceville, NJ (US)

(*) Notice: Subject to any disclaimer, the term of this patent is extended or adjusted under 35 U.S.C. 154(b) by 281 days.

(21) Appl. No.: 15/915,815

(22) Filed: Mar. 8, 2018

(65) Prior Publication Data
US 2019/0279400 A1 Sep. 12, 2019

(51) Int. Cl.
G06T 7/90 (2017.01)
G06K 9/46 (2006.01)
G06K 9/20 (2006.01)
G06F 16/583 (2019.01)

(52) U.S. Cl.
CPC ............ *G06T 7/90* (2017.01); *G06F 16/5838* (2019.01); *G06K 9/2027* (2013.01); *G06K 9/4652* (2013.01); *G06T 2207/10024* (2013.01); *G06T 2207/10152* (2013.01)

(58) Field of Classification Search
CPC ............ G06T 7/90; G06T 2207/10024; G06T 2207/10152; G06F 16/5838; G06K 9/2027; G06K 9/4652
See application file for complete search history.

(56) References Cited

U.S. PATENT DOCUMENTS

| | | | |
|---|---|---|---|
| 6,639,628 B1* | 10/2003 | Lee ..................... | H04N 9/735 345/603 |
| 6,961,461 B2* | 11/2005 | MacKinnon ............ | H04N 1/60 345/426 |
| 8,634,640 B2 | 1/2014 | Bhatti et al. | |
| 8,736,751 B2* | 5/2014 | Yun ..................... | H04N 1/02409 250/559.01 |
| 8,787,666 B2* | 7/2014 | Friedhoff ................ | G06T 5/008 382/162 |
| 9,076,068 B2* | 7/2015 | Agarwal ............... | G06K 9/4652 |
| 9,460,521 B2* | 10/2016 | Arnone ................ | G06K 9/4661 |
| 10,113,910 B2* | 10/2018 | Brunk ................... | G01J 3/2823 |
| 10,375,264 B2* | 8/2019 | Debevec .............. | G06K 9/6212 |
| 2006/0181721 A1* | 8/2006 | Kulkarni .............. | H04N 1/6033 358/1.9 |
| 2007/0242878 A1* | 10/2007 | Maxwell .............. | H04N 1/6086 382/168 |
| 2014/0232923 A1* | 8/2014 | Koh ....................... | G09G 5/02 348/333.11 |

(Continued)

*Primary Examiner* — Gregory M Desire
(74) *Attorney, Agent, or Firm* — Leason Ellis LLP

(57) ABSTRACT

A method is provided for identifying colors across illuminants using a processor configured by code executing therein, the method comprising capturing a sample image with an image recording device, the image including pixels resenting a color sample under analysis and a color reference chart. The processor is also configured to execute comparing the color values of pixels representing the color reference chart of the sample image to the pixel values corresponding to a plurality of entries within a plurality of color reference datasets to determine the color reference having the closest match of sample captured in the image. The reference identifier of the color that is the closest match to the sample is then output for further use.

19 Claims, 6 Drawing Sheets

(56) References Cited

U.S. PATENT DOCUMENTS

| | | | |
|---|---|---|---|
| 2015/0365614 A1* | 12/2015 | Ovsiannikov | H01L 27/14609 348/126 |
| 2017/0131147 A1 | 5/2017 | Yu et al. | |
| 2018/0176420 A1* | 6/2018 | Li | G06T 1/20 |
| 2019/0279400 A1* | 9/2019 | Xu | G06K 9/4652 |

\* cited by examiner

COLOR SEARCH USING A SMARTPHONE AND A REFERENCE COLOR CHART

FIELD OF THE INVENTION

The present invention is directed to systems and methods for identifying unknown colors present in a sample image taken under an unknown illuminant.

BACKGROUND OF THE INVENTION

There is often a need to capture the color of a sample and determine the closest match for that color in an existing color database. For example, a user may want to find out the paint color of a wall or piece of furniture. To do so, they might search through the paint manufacturer's fan deck to identify the color. However, such manual identifications are prone to error and are time consuming.

Efforts have been made to use images taken with a camera to identify the color of a sample by searching the color values from a color database. For example, U.S. Pat. No. 8,634,640 to Nina Bhatti et. al. (herein incorporated by reference as if presented in its entirety) teaches a method to select a color palette from a camera image, aided with a reference color chart. In that method, matrix transformations are used to convert images taken with an unknown illuminant to known illuminant, and thus eliminate the need of controlled illumination. In that method, matrix transformation was used to convert unknown illuminant to known illuminant, and thus eliminated the need of controlled illumination. However, depending on the difference between the unknown illuminant and the known illuminant, errors caused by a simple matrix transformation can be very large, and the performance of such a system can thus be poor.

Thus, what is needed in the art is a system that improves upon and advances the technological field of color searching and identification. For example, what is needed are systems and methods that utilize available cameras, such as those in smartphones, to acquire images of a sample and color reference charts under multiple unknown illuminants and use the data captured to identify the sample color from a database of colors. Furthermore, what is needed in the art are systems, methods and computer program products for evaluating color values of an image and searching for the same or similar colors in a collection of colors offered by various color vendors.

SUMMARY OF THE INVENTION

In one or more implementations described herein, a method is provided for identifying colors using a processor configured by code executing therein. The method includes capturing, using an image device, a first image of the sample and of a reference-color chart wherein the reference-color chart includes a plurality of color reference elements under a first illuminant. A second image of the sample and the reference chart is also acquired under a different illuminant from the first illuminant using the same image capture device.

A processor is configured to extract from each captured image, the color values of the pixels representing elements of the reference color chart and the sample. The processor is further configured by code to generate a measurement value, such as a matrix, for each image based on the extracted color values. A known illuminant measurement value, such as a known illuminant measurement matrix, is accessed from a memory location accessible by the processor. Here, the known illuminant measurement values can, in one implementation, refer to a measurement matrix calculated using color values obtained under a known illuminant.

The processor is then configured to use the known illuminant measurement matrix and each of the generated measurement matrices to generate a transformation matrix. The transformation matrix is used to adjust the color values of the pixels representing the sample taken in the first and additional images. The adjusted color values of the sample are, in turn, searched against a database of known color values obtained under a known illuminant. Once a match, or a color having the smallest distance from the adjusted color values, is determined, a reference tag or identifier that corresponds to the matched color is output for further use.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF CERTAIN EMBODIMENTS OF THE INVENTION

By way of overview and introduction, various embodiments of the systems and methods described herein are directed towards color searching, identification, and analysis. A camera, such as those incorporated into smart devices (telephones, tablets, etc.) is used to capture at least two (2) images of a color sample and a color reference chart under different illuminations. Since the properties of the illuminant are often not known at the time of image capture, the systems and methods described herein allow for the transformation of color values taken under unknown illuminants into color values taken under a known illuminant. Using such transformed values, the color most closely matching the measured camera values for the sample is identified by searching a database of color values taken under a known illuminant.

Figure 1B:
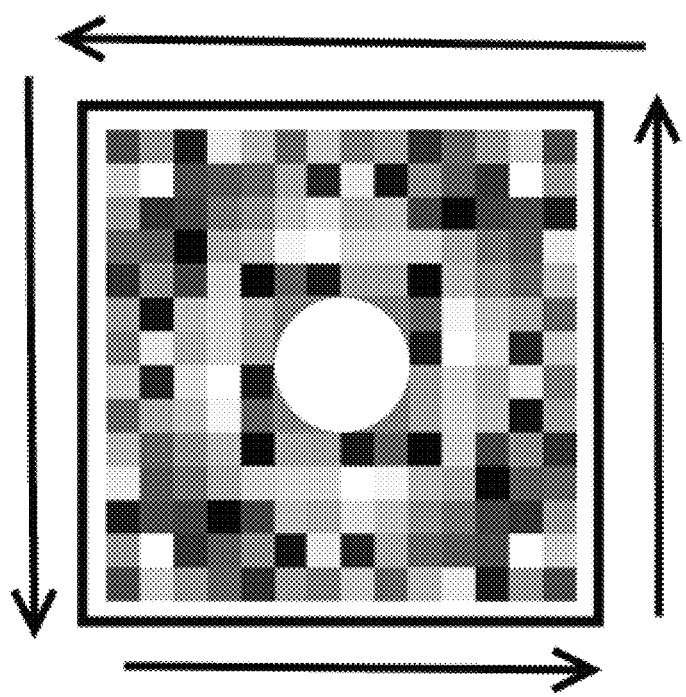
FIG. 1B illustrates an alternative view of the color reference chart according to one embodiment of the present invention.
Figure 2:
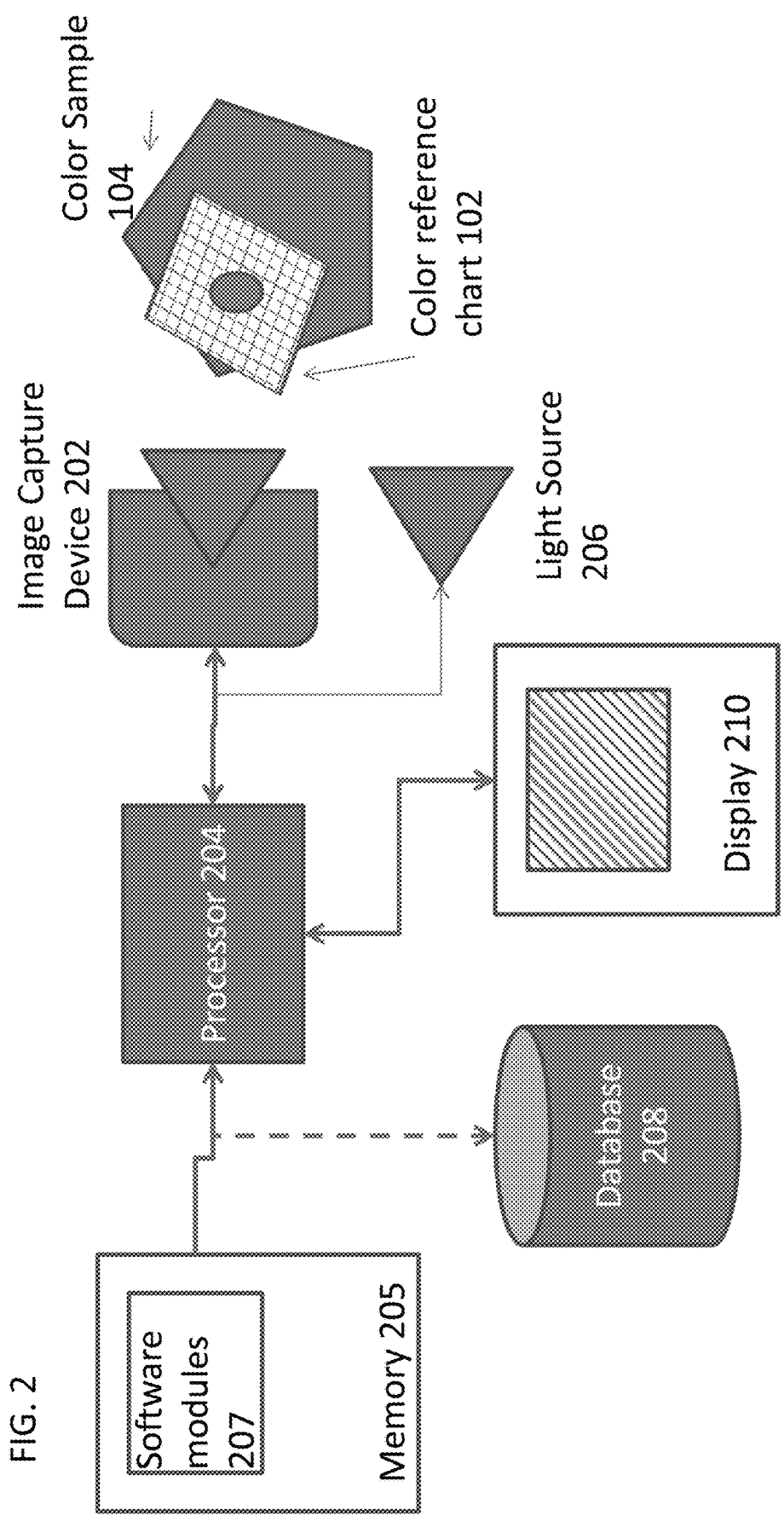
FIG. 2 illustrates a block diagram of a color search process according to one embodiment of the present invention.

As shown in FIGS. 1B and 2, the color sample 104 to be captured in an image is any physical article having color or spectral properties in need of analysis. In one implementation, the color sample 104 is a wall. In another implementation, the color sample 104 is a piece of furniture. In yet a further implementation, the color sample 104 is an object or item. In still another implementation, the color sample 104 is a fabric sample such as fleece or fabric blends. In yet another implementation, the color sample 104 is any material that has color properties desirable for analysis. For example, the color sample 104 is a section or portion of stucco, carpe, building materials, housing, chassis, packaging, or another item.

Figure 1A:
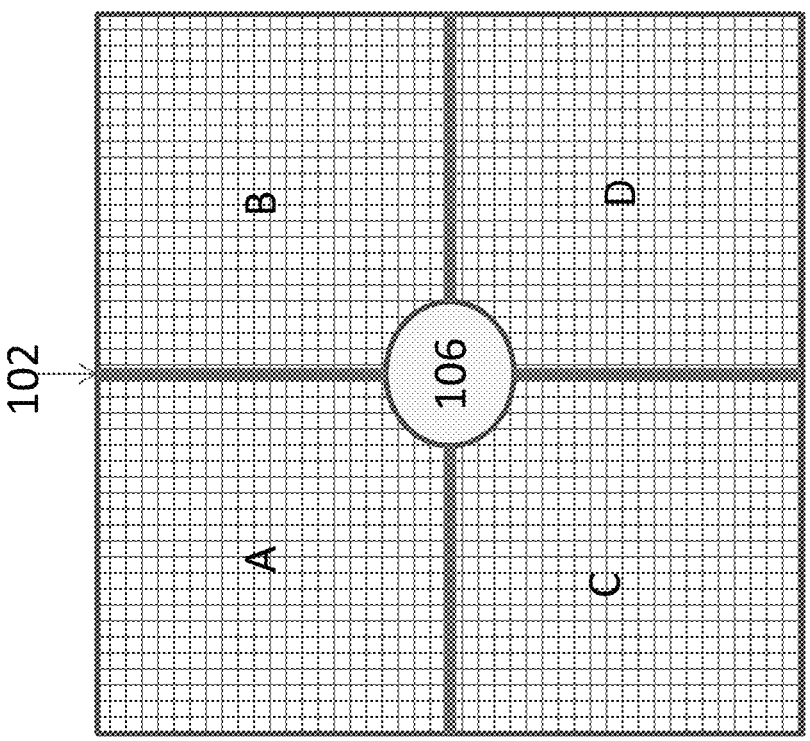
FIG. 1A illustrates the color reference chart according to one embodiment of the present invention.
Figure 1C:
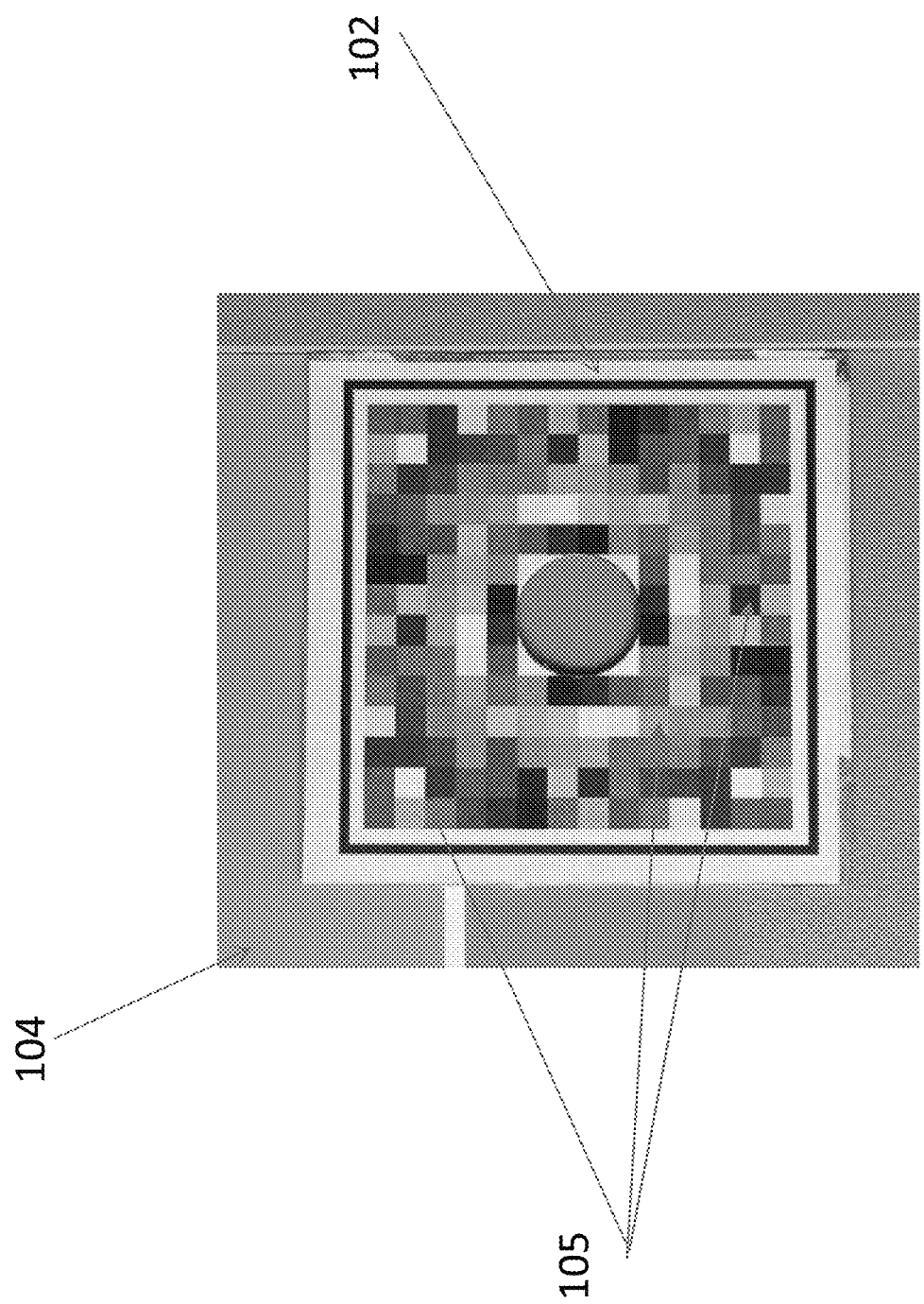
FIG. 1C illustrates an alternative view of the color reference chart according to one embodiment of the present invention.

As provided in FIGS. 1A-C, a color reference chart 102 is used to bracket the unknown color sample 104 with a collection of known color values. As shown in FIGS. 1A-B, the color reference chart 102 includes a plurality of discrete color reference elements or reflectance samples 105. Here, the color reference chart 102 is divided into four (4) quadrants about a center portion 106. In one or more configurations, the center portion 106 is an aperture or transparent window permitting the observation of a portion of a color sample 104 when the color reference chart 102 is placed in-between an image capture device 202 and the color sample 104, as shown in FIG. 1C. Alternatively, the center portion 106 of the color reference chart 102 is a stage or platform suitable for the placement of a sample 104 under analysis.

In one particular implementation, the color reference chart 102 includes four (4) quadrants. Each quadrant contains the same number of reflectance samples. In a particular arrangement, the quadrants are arranged to be four-fold rotationally symmetric about the center portion 106. In the described arrangement, each reflectance element found within a given quadrant will have counterparts in the other quadrants. Thus, while the possible number of element groups (here referred to as quadrants) are based on particular design constraints (e.g. fourfold symmetry or threefold symmetry), the number of reflectance elements within each group will always be the same. Furthermore, each member of a group of color reflectance elements has counterpart reflectance elements in each of the counterpart color reference groups. It should be noted that while each counterpart color element will have approximately the same wavelength-dependent reflectance value, variations in production of reflectance elements means that each counterpart reflectance sample will have some deviations from the known or "true" wavelength-dependent reflectance value for that reflectance element.

With reference to the specific configuration of the color reference chart 102, a color reference chart, such as the one depicted in FIG. 1A, having four-fold symmetry presents an effective way to ensure that each section of the color reference chart has same number of elements and that the shape of the color elements can be easily tiled into the area occupied by that group without overlap or empty space. Furthermore, fourfold rotation symmetry allows the counterpart reflectance elements to be at four positions under potentially spatially non-uniform illumination. Thus, by averaging the camera values determined for a reflectance element and its matching counterparts, a RGB color value can be estimated that is representative of the camera values obtained if the reflectance element had been in the center portion 106.

Those possessing an ordinary level of requisite skill in the art will appreciate that other configurations, such as the reference elements having threefold symmetry about the sample, can be used in accordance aims described herein.

With reference to FIG. 1B, quadrants A-D each are rotated 90 degrees relative to the neighboring quadrants. For example, Quadrant C represents a 90-degree counter-clockwise rotation of each element within the quadrant using the center of the reference chart as the pivot point. As shown in particular detail and described herein, each corner element of the color reference chart 102 is an identical color. Due to four-fold rotational symmetry, the color directly below the corner element in Quadrant A, is the same color as the element directly to the right of the corner element in Quadrant C.

In one particular embodiment, the provided color reference chart includes 45 color reference elements. Thus, where there are four quadrants, the color reference chart provides at least 180 color references for use in connection with the color searching and analysis system and methods described herein. Those possessing an ordinary level or skill in the requisite art will appreciate that other groups and numbers of colors are also possible and envisioned.

In one particular implementation, the color chart 102 consists a pre-set, or specified number (e.g. 4 groups of 18 different colors for a total of 72 color patches) of reference colors.

With general reference to FIG. 2, the sample 104 is placed so that at least two images of the sample can be captured by the image capture device 202 under two different illuminants. In one particular implementation, the image capture device 202 is a scientific CMOS (Complementary Metal Oxide Semiconductor), CCD (charge coupled device) or other image acquisition device and associated hardware, firmware and software. Furthermore, the image capture device 202 is configured to store or transmit recorded images as a collection of representative pixel points, data sets, binary streams, bit strings, pixel arrays, file or collection of files or other suitable format for the evaluation steps or processes described herein. As used throughout, the images captured by the image capture device 202 include spectral information, RGB information, or other multi-wavelength data representative of light reflected off the sample.

The image capture device 202, in accordance with one embodiment, is a stand-alone device capable of storing local copies of images within an integrated or removable memory. In an alternative implementation, the image capture device is configured to transmit one or more captured images to a remote storage device or processing platform, such as processor 204. In configurations calling for remote storage of image data, the image capture device 202 is equipped or configured with network interfaces or protocols usable to communicate over a network, such as the internet.

Alternatively, the image capture device 202 is connected to one or more computers or processors, such as processor 204, using standard interfaces such as USB, FIREWIRE, Wi-Fi, Bluetooth, and other wired or wireless communication technologies suitable for the transmission image data.

In a further implementation, the image capture device 202 is a camera or image recording device integrated into a smartphone, tablet, cell phone, or other portable computing apparatus. In a further embodiment, the image capture device 202 is an "off the shelf" digital camera or webcamera connected or in communication with one or more computing devices.

In a particular implementation, the image capture device 202 includes one or more light sources 206 configurable to emit light at a pre-determined wavelength or across a range of wavelengths. In one or more non-limiting implementations, the light source 206 is a separate device that is configurable to produce a light at or across a given wavelength. In one implementation, the light source is one or more discrete light emitting elements, such as a LED, OLEDs, fluorescent, halogen, xenon, neon, D65 light, fluorescent lamp, Mercury lamp, Metal Halide lamp, HPS lamp, Incandescent lamp or other commonly known or understood lighting sources. In an alternative implementation, the light source is a separate light source that is not under control of the processor or user, such as an ambient illumination source that is artificially or naturally produced.

The image obtained by the image capture device 202 is transmitted to one or more processor(s) 204 for evaluation. In one implementation, the processor 204 is located within the same device as the image capture device 202. However, in another implementation, the processor 204 is remote or separate from the image capture device 202.

In one configuration, the processor 204 is configured through one or more software modules to separate or extract color values for one or more given pixels within the image for further analysis. With further reference to FIG. 2, in one implementation, the processor 204 is a commercially available computing device. For example, the color processor 204 may be a collection of computers, servers, processors, cloud-based computing elements, micro-computing elements, computer-on-chip(s), home entertainment consoles, media players, set-top boxes, prototyping devices or "hobby" computing elements.

Furthermore, the processor 204 can comprise a single processor, multiple discrete processors, a multi-core processor, or other type of processor(s) known to those of skill in the art, depending on the particular embodiment. In a particular example, the color processor 204 executes software code on the hardware of a custom or commercially available cellphone, smartphone, notebook, workstation or desktop computer configured to receive images captured by the image capture device 202 either directly, or through a communication linkage.

The processor 204 is configured to execute a commercially available or custom operating system, e.g., MICROSOFT WINDOWS, APPLE OSX, UNIX or Linux based operating system in order to carry out instructions or code.

In one or more implementations, the color processor 204 is further configured to access various peripheral devices and network interfaces. For instance, the color processor 204 is configured to communicate over the internet with one or more remote servers, computers, peripherals or other hardware using standard or custom communication protocols and settings (e.g., TCP/IP, etc.).

The processor 204 may include one or more memory storage devices (memories). The memory is a persistent or non-persistent storage device (such as an IC memory element) that is operative to store the operating system in addition to one or more software modules. In accordance with one or more embodiments, the memory comprises one or more volatile and non-volatile memories, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules. In one or more embodiments, the memory of the processor 204 provides for the storage of application program and data files. One or more memories provide program code that the processor 204 reads and executes upon receipt of a start, or initiation signal.

The computer memories may also comprise secondary computer memory, such as magnetic or optical disk drives or flash memory, that provide long term storage of data in a manner similar to a persistent memory device. In one or more embodiments, the memory of the processor 204 provides for storage of an application program and data files when needed.

The processor 204 is configured to store data either locally in one or more memory devices. Alternatively, the processor 204 is configured to store data, such as image data or processing results, in a local or remotely accessible database 208. The physical structure of the database 208 may be embodied as solid-state memory (e.g., ROM), hard disk drive systems, RAID, disk arrays, storage area networks ("SAN"), network attached storage ("NAS") and/or any other suitable system for storing computer data. In addition, the database 208 may comprise caches, including database caches and/or web caches. Programmatically, the database 208 may comprise flat-file data store, a relational database, an object-oriented database, a hybrid relational-object database, a key-value data store such as HADOOP or MONGODB, in addition to other systems for the structure and retrieval of data that are well known to those of skill in the art. The database 208 includes the necessary hardware and software to enable the color processor 204 to retrieve and store data within the database 208.

In one implementation, each element provided in FIG. 2 is configured to communicate with one another through one or more direct connections, such as though a common bus. Alternatively, each element is configured to communicate with the others through network connections or interfaces, such as a local area network LAN or data cable connection. In an alternative implementation, the image capture device 202, processor 204, and database 208 are each connected to a network, such as the internet, and are configured to communicate and exchange data using commonly known and understood communication protocols.

In a particular implementation, the processor 204 is a computer, workstation, thin client or portable computing device such as an Apple iPad/iPhone® or Android® device or other commercially available mobile electronic device configured to receive and output data to or from database 208. Here, the processor 204 communicates with a display device 210 for displaying data as well as input hardware to permit a user to access information, and to send commands and/or instructions to the color processor 204 and the image capture device. In one or more implementations, the display device 210 is a screen, monitor, display, LED, LCD or OLED panel, augmented or virtual reality interface or an electronic ink-based display device.

Figure 3A:
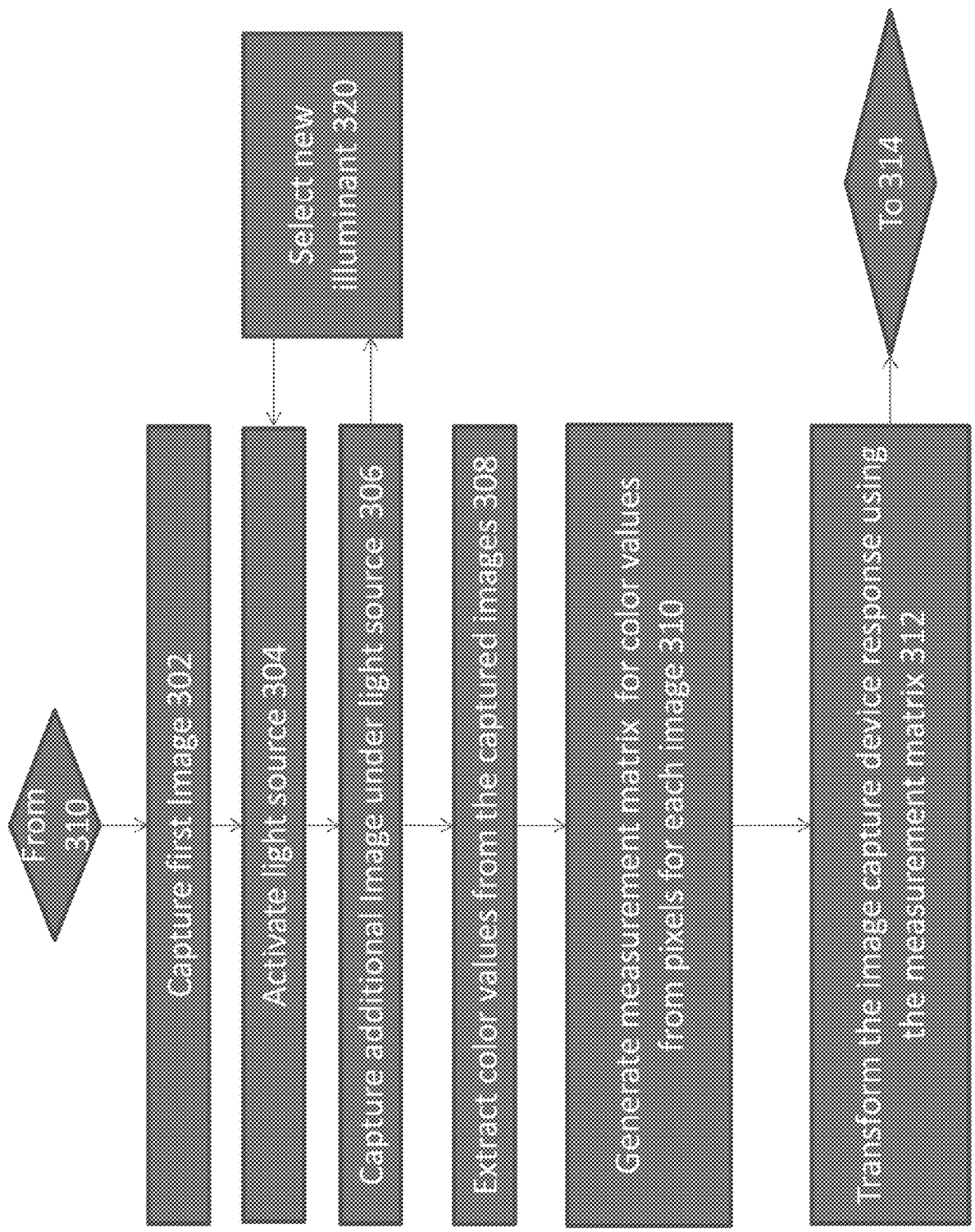
FIG. 3A presents a flow diagram detailing the steps taken in one embodiment of the color searching system according to one embodiment of the present invention.

With particular reference to FIG. 3A, in order to acquire at least two images of the color sample and color reference chart, a recording is made of the sample and the color reference chart under ambient illumination. In a particular implementation, the multiple images of the sample and reference chart are made under ambient illumination. In a further implementation, the image of the sample and reference color chart are made separately, and later combined using photo manipulation techniques. For example, so long as the ambient illuminant is not changed, an image can be generated that is a composite image formed from several individual or composite images representing at least the sample and the color reference chart. In one or more implementations, the illuminant used to capture the several images is substantially the same, but not identical.

In one specific implementation, the image of the sample and the reference chart is obtained by placing the reference chart 102 over the sample 104 such that the color of the sample is visible through the opening 106, and both the sample and the reference chart are illuminated by the same illuminant as depicted in FIG. 2.

Figure 4:
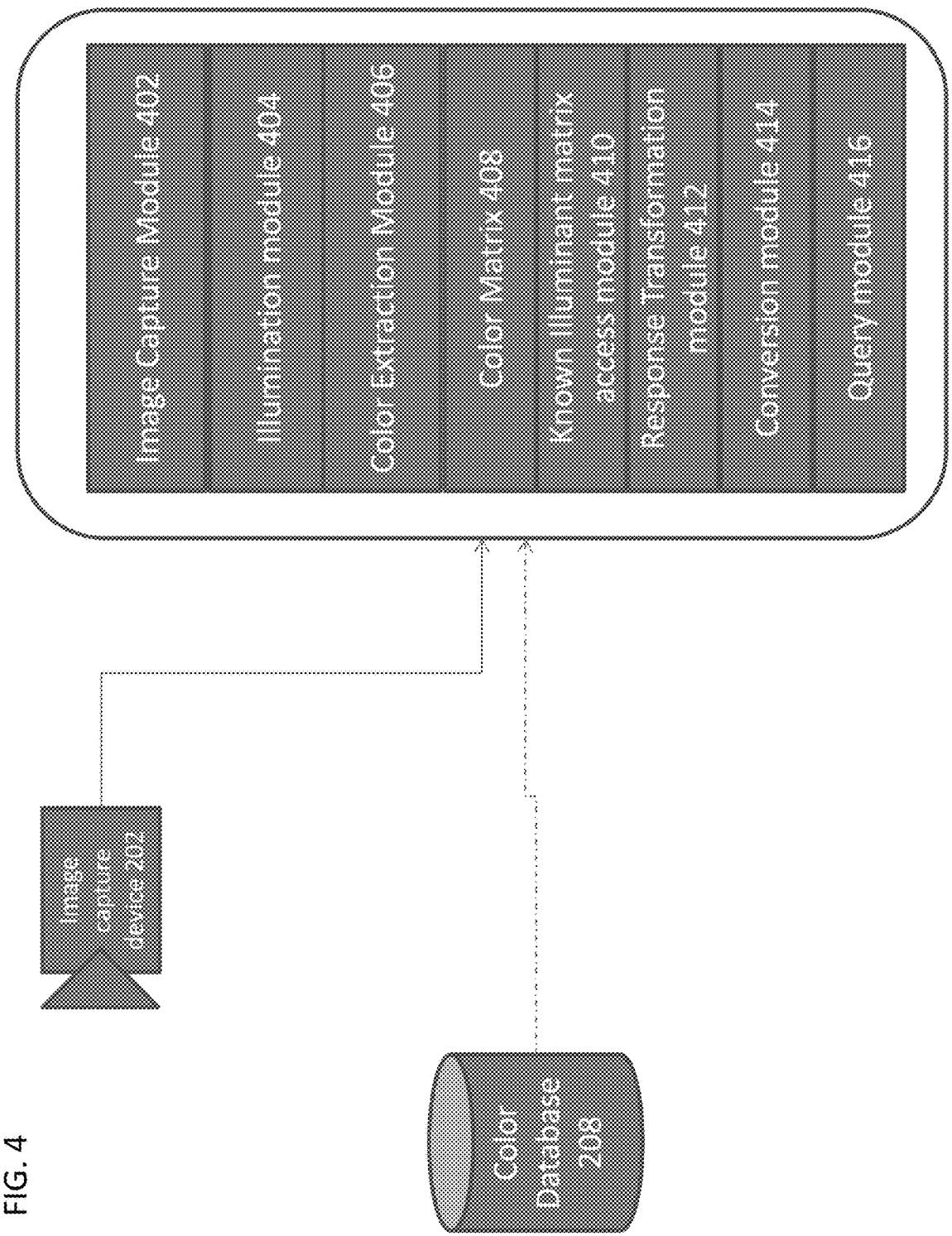
FIG. 4 presents a block diagram detailing specific components of the color searching system according to one embodiment of the present invention.

Turning to FIGS. 3A and 4, a suitably configured image capture device 202 captures one or more images of the color sample and color reference as provided in step 302 in response from a command or signal initiated by one or more processors 204. In a particular implementation, an image capture module 402 configures a computer or computing device (such as mobile computer) to instruct the image capture device 202 to capture or record an image. Here, the image captured is composed of a pixel array, where at least some of the pixels represent or correspond to a depiction of the sample 104 and reference chart 102.

In a further implementation, one or more submodules of the image capture module 402 configures the processor 204 to receive a data stream, file, or data object from the image capture device 202. Additionally, one or more submodules of the image capture module 402 further configures the processor 204 to convert or condition the received image data prior to further processing. For example, a submodule of the image capture module 402 converts the image data from one file type to another prior to further processing the image data.

In a particular implementation, the image captured by the image capture device 202 is stored within a memory of the color processor 204. Alternatively, the image of the sample 104 is stored on a remote database 208 for later retrieval or processing. In yet a further implementation, data regarding the specific make, model, brand, and settings of the image capture device 202 are stored along with the image data. For example, EXIF format data is stored with each recorded image. Where external illumination or light sources are used in conjunction with the image recording device 202, the color processor 204 is configured to obtain and store the relevant illumination data associated with the image. In one or more implementations, the processor 204 is able to query the image capture device for the wavelength of the illumination used, or independently obtain illumination characteristics from the captured images.

As shown in step 304, the processor 204 is further configured by an illumination module 404 to activate or alter the output of one or more light sources 206 illuminating the sample 104. For example, where the image capture device 202 is incorporated into a smart phone, the illumination module 404 configures the processor 204 to activate or alter the light source 206 (such as a LED) incorporated into the smartphone.

As shown in step 306, the processor 204 is configured by the image capture module 402 to obtain an image with the illumination activated. In one or more further implementations, more than a single illuminant is available. For example, as shown in step 320, the processor 204 is configured by the one or more submodules of the illumination module 404 to select a different illuminant and obtain an additional (e.g. $3^{rd}$, $4^{th}$ $5^{th}$ . . . ) image under the new light source 206.

In a further implementation where the image capture device 202 includes a wavelength variable light source 206, or multiple light sources capable of emitting the same or different wavelengths, the illuminant module 404 configures the processor to select a new wavelength for each image capture captured using the image module 302.

In one non-limiting example, one or more submodules of the image capture module 402 configures the processor 204 to format, condition or alter the captured image. For instance, the color processor 204 is configured by the image capture module 402 to alter the tone, hue, selection, field of view or other property of the image captured.

Turning to step 308, the color values of the pixels in the captured images are measured or extracted for further processing. For example, the processor 204 is configured by one or more submodules of a color extraction module 406 to extract the color values of the pixels representing the reference chart 102 and/or the sample 104. For example, one or more submodules of the color extraction module 406 configures the processor 204 to extract the RGB color values from pixels representing the reference elements in the captured images. In a further implementation, the color extraction module 406 configures the processor 204 to extract the color values for the pixels corresponding to both the color reference chart 102 and the sample 104. For instance, using one or more image recognition submodules, the color extraction module 406 configures the processor 204 to identify the sample 104 color by the shape of the aperture 106 of the color reference chart. Using one or more metrics (such as the dimensions of the color reference chart), the color extraction module 406 configures the processor 204 to extract the color from the pixels corresponding to each color reference element of the color reference chart 102.

The color extraction module 406 is further configured to store the color values (such as extracted RGB values) in database 208 or a memory accessible to one or more processors 204. By way of further non-limiting example, the processor 204 is configured by the color extraction module 406 to evaluate each pixel of the image and extract RGB or tristimulus values associated with each pixel to a data object. For example, the processor 204 is configured by the color extraction module 406 to generate an array where each element of the array corresponds to a pixel of the image and the value associated with each element contains a color value or values of the pixel in question (e.g. rgb color values).

In one further non-limiting example, the processor 204 is configured by one or more image analysis submodules to identify features of interest within the image. Here, the features identified within the image are the individual reflectance elements of the color reference chart 102 and the aperture 106 of the color reference chart from the acquired image. Upon identification of the relevant features in the image, the processor 204 extracts color values corresponding to each reference element of the color reference chart 102. As an example, the average RGB values for the area corresponding to a particular reference element are calculated and stored as the measured color value for a given location within the image. Next, one or more submodules of the color extraction module 406 configure one or more processors to evaluate the relative difference in pixel color values between each corner element and the color elements in direct contact with the corner element. In the illustration provided in FIG. 1B, the two reference elements in direct contact with the corner elements have different hues. The arrangement of the elements, as determined on hue difference provides sufficient information to determine the orientation of color reference chart 102, thus allowing the actual measurement values of the reference elements to be compared across multiple images.

Where the color reference chart contains two or more identical color elements distributed (such as four elements in the four-fold rotationally symmetric arrangement) the processor 204 can be configured by one or more submodules of the color extraction module 406 to average the measured color values for the materially equivalent samples to determine an average measured color value for a specific color found in the color reference elements. By averaging the measured values for each of the elements having the same known color value, the averaged measurement is used by the processor 204 to compensate spatial inhomogeneity of the illuminant and obtain an estimation of the RGB color values for the reflectance sample as if it were placed in the center portion 106. However, other arrangements, the one or more submodules of the color extraction module 406 configure the processor 204 to select a preferred color reference element as representative of a specific color value.

In a further arrangement, the color values measured or extracted according to step 308 are RGB color values. Upon extraction of the color values for the sample and reference elements, the extracted or measured color values are stored in the local or remote memory 205. Using the color reference chart of FIG. 1B, for each image processed by the processor 204 configured by the color extraction module 406, a data object or objects referencing the RGB reading of the sample color and the reference colors are generated.

In one particular implementation, the processor 204 is configured by a measurement matrix module 408 to transform or manipulate the measured or extracted color values in order to generate a measurement matrix of the measured color values. For example, as shown in step 310, one or more submodules of the measurement matrix module 408 configures the processor 204 to generate a measurement matrix of the colors under the first illuminant $P1(\lambda)$ (e.g. an image taken under ambient lighting) according to:

$$W_1(t,n) = R(t,\lambda) * \text{diag}(P1(\lambda)) * S(\lambda,n) \tag{1}$$

Similarly, under a different illuminant $P2(\lambda)$, a measurement matrix can be obtained:

$$W_2(t,n) = R(t,\lambda) * \text{diag}(P2(\lambda)) * S(\lambda,n) \tag{2}$$

Here, the wavelength values $\lambda$ used in each calculation depend on the illuminants. For instance, the wavelength of the ambient illumination and the wavelength of the activated light source 206 represent different values $P1(\lambda)$ and $P2(\lambda)$. Likewise, the camera responses (e.g. the output of the imaging sensor) are $S(\lambda, n)$, where n=r, g, b, and the reflectances of the color chart are $R(t, \lambda)$, where t=1, 2, ... T, where T is the total number of different colors on the reference color chart. As an example, provided in FIG. 1B-C, the number T, is 18.

A standard illuminant measurement matrix is used to further process the data generated by the processor 204. For example, the processor 204 is configured by an illuminant matrix module 410 to access a measurement matrix generated from the color reference chart 102 obtained using a known illuminant. For instance, the processor 204 configured by the known illuminant matrix module 410 is able to access a previously generated measurement matrix from the memory or a database 208.

In a further implementation, a submodule of the known illuminant matrix module 410 configures the processor 204 to generate a measurement matrix for measurement values obtained under a standard illuminant $P0(\lambda)$ according to:

$$W_0(t,n) = R(t,\lambda) * \text{diag}(P0(\lambda)) * S(\lambda,n) \tag{3}$$

Here, the known illuminant matrix module 410 configures the processor 204 to access the necessary values in order to generate the standard illuminant matrix $W_0$. For instance, the illuminant matrix module 410 is configured to access stored data values relating to camera response values, light source 206 wavelength, reference elements and other factors necessary to derive a measurement matrix of an image taken under standard illuminant.

Turning to step 312, the response of the image capture device 202 is converted by the processor 204 configured by a response transformation module 412. Here, the goal of the transformation module 412 is to convert the image capture device 202 response of a sample color under illuminant P1 and P2 into that under standard illuminant P0. In a particular implementation, the response transformation module 412 configures the processor 204 to calculate a transformation matrix M from the generated or accessed $W_1$, $W_2$ and $W_0$ values. In a further implementation, the response transformation module 412 calculates the transformation matrix M using the Moore-Penrose pseudo-inverse algorithm. For example, by way of non-limiting implementation, the transformation matrix M is calculated according to:

$$M = \text{pinv}([W_1, W_2]) * W_0 \tag{4}$$

Figure 3B:
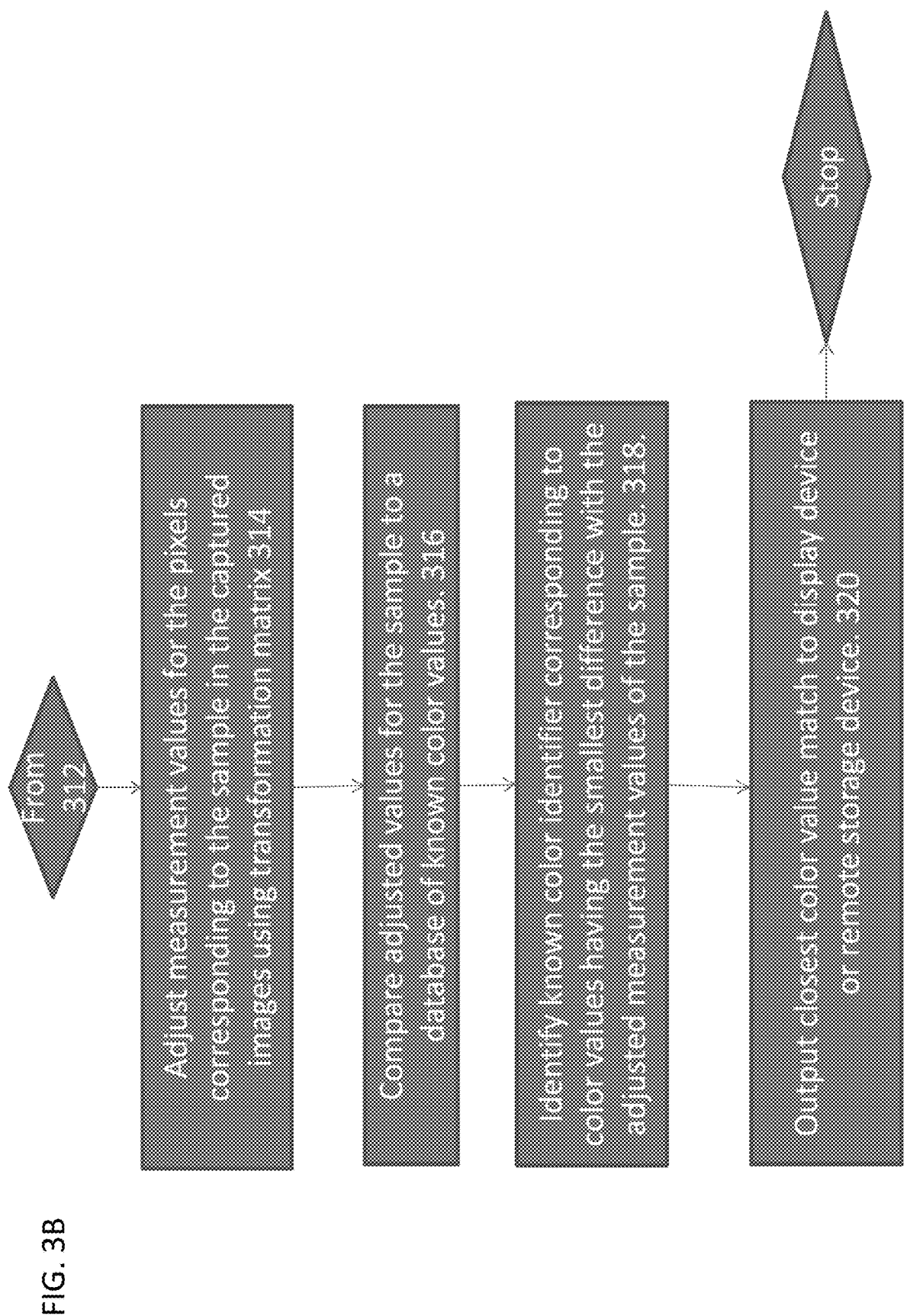
FIG. 3B presents a flow diagram detailing the steps taken in one embodiment of the color searching system according to one embodiment of the present invention.

Using transformation matrix M, any unknown color sample measured under illuminant $P_1$ and $P_2$ can be converted to its corresponding color value as if it were measured under standard illuminant $P_0$. As shown in step 314 of FIG. 3B the color values of the pixels corresponding to the sample 104 (such as the color values extracted according to step 308) are transformed by a processor 204 configured by a conversion module 414 to alter the color values according to the transformation matrix M. By way of non-limiting implementation, the conversion matrix 414 configures the processor 204 to alter the measurement matrix of color values corresponding to the sample according to the following:

$$W_{0\ converted} = [W_{1sample}, W_{2sample}] * M \tag{5}$$

The converted value $W_{0\ converted}$ (which represents the converted color value of the sample) is used to search one or more color databases for the closest match to the converted value. In one implementation, the color database searched is a database of color values obtained under the standard illuminant. Continuing with the flow diagram of FIG. 3B, the closest match represents the mostly likely color of the sample. In one implementation, as shown in step 316, the processor 204 searches a remote or local color reference database to determine the closest match. For example, the processor 204 is configured by a query module 416 to iterate over the entries, such as tables, data, objects, lists or arrays, stored within the color reference database, to determine the color values having the smallest difference to the converted color values.

In one further arrangement, the color database includes one or more reference identifiers, names, tags or other item that matches the entries in the color database to other color references. For example, the color reference database has data associated with each entry that provides a specific manufacturer's brand or common name for the collection of color values stored. In this way, the processor 204 is able to access a common name to the user enabling the purchasing or procuring of the desired color as in step 318.

In yet a further implementation, each database 108 of stored reference colors is limited to a particular color selection or listing offered by a specific manufacturer or supplier. For instance, each sample included in the collection of a database is a color in a manufacturer or supplier's color fan deck.

Once the color reference has been identified, the query module 416 configures the processor 204 to output the color reference tag to a display device 110 or store the identified color value in a database for further use.

By way of non-limited example, the system and methods described herein can be used to identify colors from a known color value fan deck. For example, 18 colors from a 1950-color NCS fan-deck were selected as reference colors. In this example, a LED light and 12 other illuminants including D65 light, fluorescent lamp, Mercury lamp, Metal Halide lamp, HPS lamp, Incandescent lamp and others were used to evaluate the functionality and improvement represented by the system and methods described herein over the prior art techniques and technologies. Those possessing an ordinary level of skill in the requisite art will appreciate that since the reflectance's of the NCS colors are known, and the camera response is also known, the measurement matrix $W_0$, $W_1$ and $W_2$ of the 18 reference colors under any three chosen illuminants can be calculated using equations (1)~(3) provided above. Additionally, a database of measurement matrix for the total 1950 colors under the chosen standard illuminant can also be calculated using equation (3), where t=1~1950.

Images of each of the 18 colors in the NCS fan deck were acquired under the different illuminate sources. In one particular implementation, images were acquired under D65 illumination (used here as the standard illuminant) to construct a database for all the NCS colors. Next, at least one of the 12 illuminants were selected to represent ambient light. Additionally, a LED light is selected as the first illuminant ($P_1$). In one particular implementation, the LED light used has the same spectral distribution characteristics as a flash light from the smartphone. The two measurement matrices for the each of the selected reference colors, one using only "ambient" light and the other with "ambient"+the LED were calculated using one or more processors 204. Using these values, a transformation matrix is calculated that is operative to convert any obtained under the ambient and ambient+LED illuminant into its corresponding color as if it were obtained using the standard illuminant.

To test the functionally of the system and method described, each color of the 1950 NCS fan deck was evaluated and converted into to a measurement matrix measurement and then further transformed into the corresponding standard illuminant color values. Once the color values have been converted into the standard illuminant color values, the converted color values are searched in a database of colors to find the closest match. Since the sample colors values were known prior to the evaluation using the systems and methods described the efficacy of the system could be quantified (see Table 1). Here, where the closest identified color in the color database is the known color (e.g. the system correctly identifies the known color), it is labeled a success in the first match. If the second closest match is the correct color, it is labeled a success in the second match, so on and so forth. After going through all the colors, a statistical success rate can thus be calculated. For example, the first match success rate means in the total 1950 NCS colors, the percentage of the colors that can be found successfully in the first match.

Table 1 shows the improvement of the multi-illuminant approach compared to traditional single illuminant approach. The ambient only result is calculated using equations (4) and (5) with only a single measurement matrix W1 used.

TABLE 1

Improvement of the multi-illuminant approach on color search success rate

| | Ambient Only | | Ambient + LED flash | |
|---|---|---|---|---|
| | first match (%) | first three match (%) | first match (%) | first three match (%) |
| Cool White FL | 80 | 95.9 | 100 | 100 |
| Daylight FL | 94.7 | 98.9 | 99.4 | 100 |
| Tri-phosphor FL | 82.1 | 97.1 | 98.9 | 99.6 |
| Metal Halide | 87.3 | 97.6 | 99.2 | 100 |
| Mercury | 41.4 | 63.9 | 99.9 | 100 |
| HPS | 56.6 | 81.1 | 99.3 | 100 |
| Super HPS | 72.5 | 92.4 | 100 | 100 |
| Incandescent | 93.6 | 99.7 | 99.9 | 100 |
| NEODIMIUM incandescent | 92.9 | 99.8 | 99.8 | 100 |
| Equal energy | 100 | 100 | 100 | 100 |
| D65 | 100 | 100 | 100 | 100 |
| Triphosphor broadened | 77.2 | 95.2 | 99 | 99.6 |

The result tells indicates that by using the additional LED flash combined with the ambient measurement, the success rate of color search is increased.

The same approach can be used when the smartphone has more than one LED light with different spectral power distribution. In this case, the measurement process is to take an image of the sample color with the reference color chart with only the ambient light, and then take additional images of the colors with one or more LED turned on. In the matrix transformation calculation, the two-measurement matrix can be increased to three or more in equations (4) and (5), with similar results.

While this specification contains many specific embodiment details, these should not be construed as limitations on the scope of any embodiment or of what can be claimed, but rather as descriptions of features that can be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems cited throughout this application are incorporated by reference herein. Citation of any above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the claims that follow, the respective features recited in those claims, and by equivalents of such features.

What is claimed is:

1. A method for identifying colors within an image of a sample, the method comprising:
   capturing, using an image device, a first image of the sample and of a reference-color chart under a first illuminant, wherein the reference-color chart includes a plurality of color reference elements;
   capturing, using the image device, at least one additional image of the sample and of the reference-color chart under at least one additional illuminant, where the at least one additional illuminant differs from the first illuminant;
   extracting from the first image and the at least one of the additional image at least the color values of the pixels depicting the plurality of color reference elements using at least one processor having memory configured by program code executed;
   generating, using the at least one processor, a measurement value for each image based on the extracted color values;
   obtaining, using the at least one processor, a known illuminant measurement value for the colors of the reference color chart under a known illuminant;
   calculating, using the at least one processor, a transformation value using the known illuminant measurement value and each generated measurement value;
   adjusting, the at least one processor, the color values of the pixels representing the sample taken in the first and additional images according to the transformation value;
   identifying, using the at least one processor, from one or more entries of one or more datasets of known color values, wherein each entry includes a collection of color values and a color reference tag, a color reference tag corresponding to a collection of color values having the smallest difference in color values with the adjusted color values representing the sample in the first image; and
   outputting, by the at least one processor, at least the color reference tag.

2. The method of claim 1, where the step of obtaining the known illuminant measurement value includes:
   accessing from a data storage location, a measurement matrix representing the color values of the color reference chart under a known illuminant.

3. The method of claim 1, where the step of obtaining the known illuminant measurement value includes:
   accessing from a data storage location, one or more measurement values for each color of the color reference chart obtained under a known illuminant; and
   calculating a measurement matrix using the color values.

4. The method of claim 1, wherein the measurement values are expressed as a matrix.

5. The method of claim 4, wherein the measurement matrix for each image is calculated according to:

$$W(t,n)=R(t,\lambda)*\mathrm{diag}(P(\lambda))*S(\lambda,n)$$

where wavelength $\lambda$ is the wavelength of the illuminant used to capture the image, the image device response value is $S(\lambda, n)$, where n=r, g, b, and the reflectances of the color chart are $R(t, \lambda)$, where t=1, 2, ... T and T is the total number of different colors on the reference color chart.

6. The method of claim 5, wherein the transformation value is expressed as a matrix.

7. The method of claim 6, wherein the transformation matrix is calculated using a matrix pseudoinverse of the measurement matrix.

8. The method of claim 6, wherein the transformation matrix is calculated using a Moore-Penrose pseudo-inverse.

9. The method of claim 6, wherein the transformation matrix M is calculated according to:

$$M=p\mathrm{inv}([W_1, W_2])*W_0$$

where, $W_1$, $W_2$, are the respective measurement matrix under the first illuminant and at least one additional illuminant, and $W_0$ is a measurement matrix representing the color values of the color reference chart obtained under a known illuminant.

10. The method of claim 9 wherein the adjusting the color values of an sample includes $W_{0\ converted}=[W_{1\ sample}, W_{2\ sample}] * M$ $W_0$ converted represents the converted color value of the sample under standard illuminant, and $W_{1\ sample}$, $W_{2\ sample}$ represent the measurement matrix representing measurement of the sample color under the first and additional illuminants.

11. The method of claim 1, wherein the one additional illuminant is a combined illuminant that includes the first illuminant.

12. The method of claim 1, wherein the color reference chart has a plurality of identical color reference element groups, the color reference element groups arranged so as to be rotationally symmetric; each color reference group comprised of a plurality of color reference elements having a known wavelength-dependent reflectance value.

13. The color identification method of claim 1, wherein the first and the at least one additional illuminants have different spectral distribution characteristics.

14. A system for identifying colors within an image of a sample, the system comprising:
   an image capture device configured by at least one processor to capture a first image of the sample and of a reference-color chart under a first illuminant, wherein the reference-color chart includes a plurality of color reference elements; and least one additional image of the sample and of the reference-color chart under at least one additional illuminant that differs from the first; and
   at least one processor having a memory and configured to:
      extract from the first image and the at least one of the additional image the RGB values of the pixels depicting the plurality of color reference elements using a processor having memory configured by program code executed;
      generate a measurement value for each image based on the extracted color values;
      obtain a known illuminant measurement value for the colors of the reference color chart under a known illuminant;
      calculate a transformation value using the known illuminant measurement value and each generated measurement value;
      adjust the color values of the pixels representing the sample taken in the first and additional images according to the transformation value; and
      identify from one or more entries of one or more datasets of known color values, wherein each entry includes a collection of color values and a color reference tag, a color reference tag corresponding to a collection of color values having the smallest difference in color values with the adjusted color values representing the sample in the first image.

15. The system of claim 14, further comprising a display device configured to display at least the identified color reference tag.

16. The color identification system of claim 14, wherein color reference groups have fourfold rotational symmetry about the center portion.

17. The color identification system of claim 14, wherein image capture device and the processor are integrated into a single mobile device.

18. The color identification system of claim 14, wherein each color reference element group comprises identical colors reference elements.

19. The color identification of system of claim 14, wherein the first and the at least one additional illuminants have different spectral distribution characteristics.

* * * * *